(12) United States Patent
Gubbels

(10) Patent No.: US 6,859,992 B2
(45) Date of Patent: Mar. 1, 2005

(54) METHOD OF PROVIDING A HEAT SHIELD IN AN ELECTRIC MOTOR

(75) Inventor: Alex Gubbels, Ontario (CA)

(73) Assignee: Siemens VDO Automotive Inc., Mississauga (CA)

( * ) Notice: Subject to any disclaimer, the term of this patent is extended or adjusted under 35 U.S.C. 154(b) by 185 days.

(21) Appl. No.: 10/201,337

(22) Filed: Jul. 23, 2002

(65) Prior Publication Data

US 2003/0127923 A1 Jul. 10, 2003

Related U.S. Application Data

(62) Division of application No. 10/040,014, filed on Jan. 4, 2002, now Pat. No. 6,674,198.

(51) Int. Cl.[7] .................. H02K 15/00; H02K 15/14; H02K 15/16
(52) U.S. Cl. ............... 29/596; 29/597; 29/598; 310/64; 310/86; 310/89
(58) Field of Search .............. 29/596, 597, 598; 310/64, 86, 89

(56) References Cited

U.S. PATENT DOCUMENTS

| | | | |
|---|---|---|---|
| 3,899,302 A | 8/1975 | Wagner | 23/288 |
| 3,916,860 A | 11/1975 | Nakano et al. | 123/122 |
| 4,011,849 A | 3/1977 | Latham | 123/198 |
| 4,259,603 A | * 3/1981 | Uchiyama et al. | 310/68 B |
| 4,933,581 A | * 6/1990 | Shramo | 310/86 |
| 5,180,279 A | 1/1993 | McLane-Goetz et al. | 415/177 |
| 5,233,953 A | 8/1993 | Whitehurst et al. | 123/198 |
| 5,347,810 A | 9/1994 | Moore, III | 60/323 |
| 5,419,119 A | 5/1995 | Obney | 60/253 |
| 5,603,297 A | 2/1997 | Wolf et al. | 123/195 |
| 5,649,510 A | 7/1997 | Linze | 123/198 |
| 5,680,757 A | 10/1997 | Pirchl | 60/299 |
| 5,738,506 A | 4/1998 | Mosig et al. | 431/90 |
| 5,831,357 A | 11/1998 | Stohler et al. | 310/52 |
| 5,844,177 A | 12/1998 | Pirchl | 181/211 |
| 6,078,117 A | 6/2000 | Perrin et al. | 310/68 |
| 6,120,011 A | 9/2000 | Maeno et al. | 267/140 |
| 6,129,328 A | 10/2000 | Knurek et al. | 248/638 |
| 6,155,780 A | * 12/2000 | Rouse | 415/173.3 |
| 6,318,734 B1 | 11/2001 | Boskamp | 277/598 |

* cited by examiner

*Primary Examiner*—Carl J. Arbes
*Assistant Examiner*—Tim Phan

(57) ABSTRACT

A method provides a heat shield on an electric motor. The motor has a housing and an endcap coupled to an end of the housing. The endcap includes a bearing pocket constructed and arranged to cover a bearing structure. The method includes coupling a heat shield directly to the motor so as to surround and cover the bearing pocket, with a portion of the heat shield being spaced from the bearing pocket.

7 Claims, 2 Drawing Sheets

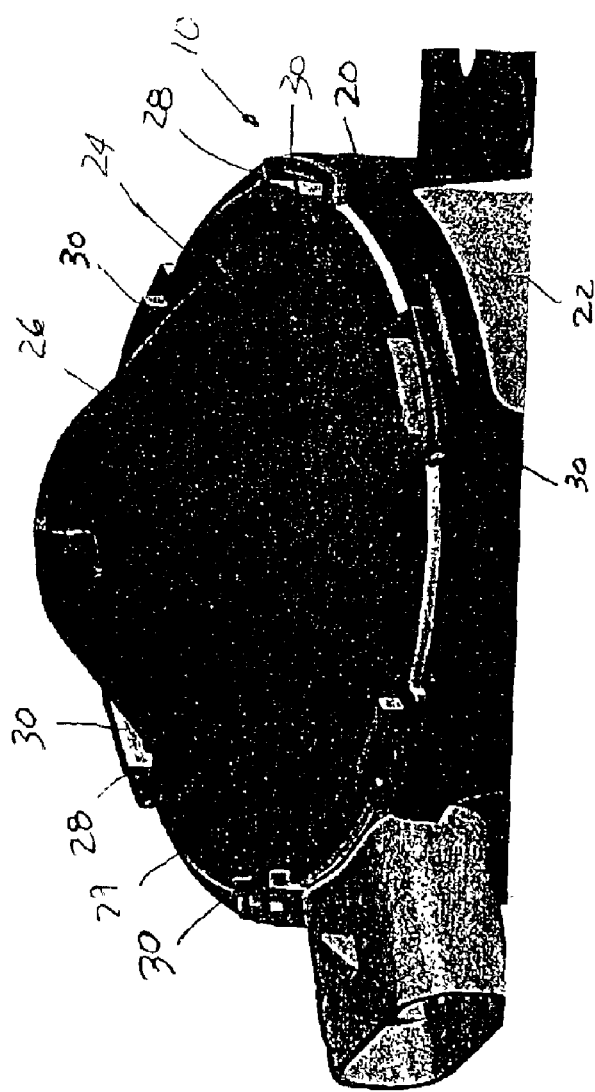
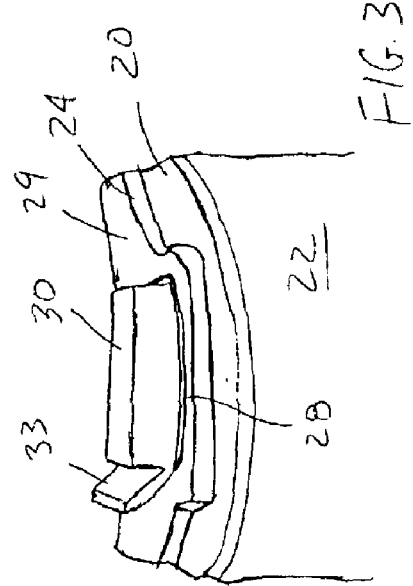

METHOD OF PROVIDING A HEAT SHIELD IN AN ELECTRIC MOTOR

CROSS REFERENCE TO RELATED DOCUMENT

The present application is a division of application Ser. No. 10/040,014, filed on Jan. 4, 2002, now U.S. Pat. No. 6,674,198 B2.

FIELD OF THE INVENTION

The invention relates to electric motors for use in engine cooling fan structures and, more particularly, to an electric motor having a heat shield coupled thereto to reflect radiant heat away from a bearing structure of the motor.

BACKGROUND OF THE INVENTION

Electric motors are commonly used in engine cooling fan structures to drive a fan that pumps cooling airflow through a radiator to cool the engine; During operation of the engine, engine compartment temperatures may reach levels that can damage the bearings of the electric motor.

Heat shields have been employed on a shroud structure of engine cooling fan structure to deflect heat from a motor used to drive a cooling fan. However, since the heat shield is coupled directly to the shroud, it is difficult to mount the shield to shrouds of different configurations so as to shield particular motors. Thus, a heat shield may need to be configured specifically for a particular should/motor assembly.

Accordingly, there is a need to provide a heat shield integrated with an electric motor to deflect radiant heat from bearing structure of the motor.

SUMMARY OF THE INVENTION

An object of the invention is to fulfill the need referred to above. In accordance with the principles of the present invention, this objective is achieved by providing an electric motor structure including an electric motor having a housing and an endcap coupled to an end of the housing. The endcap includes a bearing pocket constructed and arranged to cover a bearing structure. The motor structure also includes a heat shield coupled directly to the motor so as to surround and cover the bearing pocket, with a portion of the heat shield being spaced from the bearing pocket.

Another aspect of the invention relates to a method of providing a heat shield on an electric motor. The motor has a housing and an endcap coupled to an end of the housing. The endcap includes a bearing pocket constructed and arranged to cover a bearing structure. The method includes coupling a heat shield directly to the motor so as to surround and cover the bearing pocket, with a portion of the heat shield being spaced from the bearing pocket.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which:

FIG. 2 is a perspective view of a top of the electric motor structure of the invention shown prior to a staking process.

FIG. 3 is an enlarged perspective view of a tab shown after a staking process to lock a heat shield and endcap to a motor housing.

DETAILED DESCRIPTION OF THE PREFERRED EMBODIMENT

Figure 1:
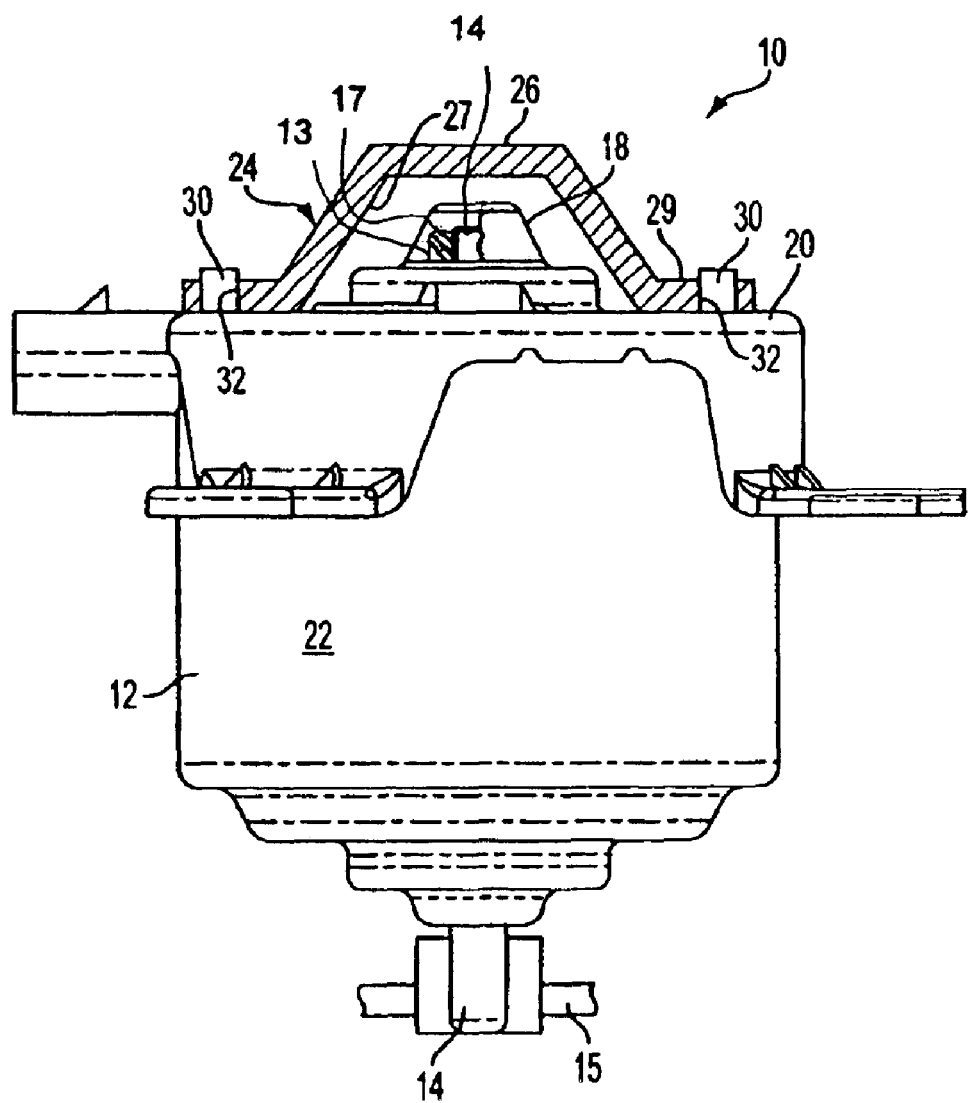
FIG. 1 is a side view of an electric motor structure including a heat shield, shown in section, coupled to an electric motor.

With reference to FIG. 1, a preferred embodiment of an electric motor structure 10 is shown in accordance with the principles of the present invention. The electric motor structure 10 includes a conventional electric motor 12, having a shaft 14 supported for rotation by a bearing structure 13 to drive a fan 15 for engine cooling. At one end of the motor 12, the bearing structure 13 is housed in a bearing pocket 18 of an endcap 20 of the motor 12 so that the bearing pocket 18 covers a distal end 17 of the bearing structure 13. The endcap 20 closes an open end of a motor housing 22. The bearing pocket 18 of the endcap 20 contains lubricant for lubricating the bearing structure.

The electric motor structure 10 includes a heat shield, generally indicated at 24, coupled directly thereto. The heat shield 24 is generally bowl-shaped and is preferably made from aluminum, stainless steel or other metal that has a shiny outer surface 26 to reflect heat. As best shown in FIG. 2, the heat shield 24 includes mounting slots 28 therein spaced along a planar peripheral portion 29 of the heat shield 24. The mounting slots 28 are used to couple the heat shield 24 to the motor 12 as explained below.

The motor housing 22 includes a plurality of tabs 30 extending therefrom and the endcap 20 includes a plurality of slots 32. Each slot 32 receives an associated tab 30 so that the endcap 20 covers the open end of the housing 22. In the illustrated embodiment as shown in FIG. 2, the mounting slots 28 of the heat shield 24 are placed over the tabs 30, after the endcap 20 is assembled, such that the heat shield 24 surrounds and covers the bearing pocket 18 of the endcap 20. The tabs 30 are then staked to secure the heat shield 24 and the endcap 20 to the motor housing 22. The staking process is conventional, wherein a knife edge is used to contact at least a portion of each of the tabs 30 to cut and spread the tabs 30 to extend beyond the slots 28 and 32 thus securing the heat shield 24 and endcap 20 to the motor housing 22. An example of a staking process is shown in FIG. 3. In particular, FIG. 3 shows the heat shield 24 and endcap disposed over a tab 30 of the housing 22. It can be seen that a cut portion 33 of the tab 30 extends beyond the width of the slot 28 and slot 32 (not shown) to secure the heat shield 24 and endcap 20 to the housing 22.

Thus, the heat shield 24 surrounds and covers the bearing pocket 18, with the bowl-shaped portion 27 of the heat shield being spaced from the bearing pocket 18 (FIG. 1).

It can be appreciated that instead of using a staking process, the heat shield 24 can be coupled to the endcap 20 via fasteners.

The heat shield 24 thus reduces heat from localized engine heat sources from directly radiating to the bearing pocket 18 of the electric motor 12. The heat shield 24 is constructed and arranged to lower the temperature of the bearing pocket 18 preferably by 5 to 10 degrees F. Mounting of the heat shield is simplified since the heat shield is coupled directly to the motor instead of a shroud structure.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. A method of providing a heat shield on an electric motor, the motor having a housing and an endcap coupled to an end of the housing, the endcap including a bearing pocket constructed and arranged to cover a bearing structure, the method including, coupling a heat shield directly to the motor so as to surround and cover the bearing pocket and to define a distal end of the motor, and ensuring that a portion of the heat shield is spaced from and in non-contacting arrangement with the bearing pocket, such that ambient heat radiates to the heat shield and not directly to the bearing pocket of the endcap.

2. The method of claim 1, wherein the housing includes a plurality of tabs and the endcap includes slots with each slot receiving an associated tab, and wherein the heat shield includes mounting slots therein, the coupling step including:

receiving a tab in a slot of the endcap and in a mounting slot of the heat shield, and deforming the tab to secure the heat shield and endcap to the housing.

3. The method of claim 2, wherein the step of deforming includes using a knife edge to cut and spread the tab to extend beyond a width of the mounting slot.

4. The method of claim 2, wherein the heat shield includes a generally bowl-shaped portion and a planar peripheral portion, the mounting slots being spaced along the planar peripheral portion of the heat shield.

5. The method of claim 1, wherein an outer surface of the heat shield is constructed and arranged to reflect radiating heat.

6. The method of claim 5, wherein the heat shield is composed of aluminum.

7. The method of claim 5, wherein the heat shield is composed of metal.

* * * * *